United States Patent [19]

Sakura et al.

[11] Patent Number: 5,669,264
[45] Date of Patent: Sep. 23, 1997

[54] APPARATUS FOR PREVENTING URGING ROTATION OF A BALL SCREW SHAFT FOR A LINEAR WORKING MACHINE

[75] Inventors: Shunji Sakura, Kyoto; Koichi Saeda, Higashiosaka; Hiroto Sunaba, Osaka; Naoto Shibata, Takatsuki, all of Japan

[73] Assignee: Tsubakimoto Chain, Co., Osaka, Japan

[21] Appl. No.: 547,398

[22] Filed: Oct. 24, 1995

[30] Foreign Application Priority Data

Jun. 15, 1995 [JP] Japan ................. 7-148866

[51] Int. Cl.⁶ .................................................. F16H 27/02
[52] U.S. Cl. ................................. 74/89.15; 74/424.8 R
[58] Field of Search ......................... 74/89.15, 424.8 R, 74/424.7; 192/8 R, 8 C

[56] References Cited

U.S. PATENT DOCUMENTS

| | | |
|---|---|---|
| 4,637,272 | 1/1987 | Teske et al. ................. 74/89.15 |
| 4,679,451 | 7/1987 | Nakamura . |
| 4,727,762 | 3/1988 | Hayashi . |
| 4,763,319 | 8/1988 | Nakamura . |
| 4,910,419 | 3/1990 | Hayashi et al. . |
| 5,027,667 | 7/1991 | Weyer .......................... 74/89.15 |
| 5,388,471 | 2/1995 | DeCampos et al. ........... 74/89.15 |

FOREIGN PATENT DOCUMENTS 4-62946  5/1992  Japan .

*Primary Examiner*—Charles A. Marmor
*Assistant Examiner*—David M. Fenstermacher
*Attorney, Agent, or Firm*—Armstrong, Westerman, Hattori, McLeland & Naughton

[57] ABSTRACT

An apparatus for preventing urging rotation of a ball screw shaft in a linear working machine includes a housing. A compressive force stopper and a tensile force stopper is contained in an outer casing of the housing. The compressive force stopper and the tensile force stopper are pressed against the compressive force receptive rotation member and the tensile force receptive rotation member respectively. A coil spring is strictly wound around an outer periphery of the compressive force receptive rotation member and the tensile force receptive rotation member. Urging rotation of the ball screw shaft by external force in an axial direction is prevented by the compressive force receptive rotation member, the tensile force receptive rotation member and the coil spring.

2 Claims, 4 Drawing Sheets

APPARATUS FOR PREVENTING URGING ROTATION OF A BALL SCREW SHAFT FOR A LINEAR WORKING MACHINE

FIELD OF THE INVENTION

The present invention generally relates to a linear working machine which includes an output shaft that is mounted on a nut that is screwed on a screw shaft and that is moved back and forth within a housing by amounts corresponding to rotation of the screw shaft and, more particularly, to an improved apparatus for preventing inducing rotation of the screw shaft when an external force is exerted on the output shaft in an axial direction thereof.

BACKGROUND OF THE INVENTION

Conventionally, a linear working machine of this kind is disclosed in Japanese Unexamined Utility Model Publication No. Hei 4-62946.

Generally, the working machine, as shown in FIG. 1, uses a ball screw having low frictional resistance for a screw shaft and a nut, in order to reduce the friction between the screw shaft 32 and the nut 33, thereby smoothing advance and retreat of the output shaft.

A conventional linear working machine which uses a ball screw, has the problem that the output shaft tends to rotate, because of the provision of a rotary urging force caused by a scarcity of frictional resistance through the ball nut when a compressive or a tensile force is exerted on the output shaft in an axial direction thereof.

FIG. 4–5 show a related apparatus for preventing a rotary urging force of a ball screw shaft.

Referring to FIG. 1, a linear working machine so is shown which includes a driving motor 31 for rotating a ball screw shaft 32 in a clockwise and counter-clockwise direction, a ball nut 33 movable along the ball screw shaft 32, an output shaft 34 attached to the ball nut 33, and an outer casing 36. The output shaft 34 is linearly movable to-and-fro responsive to the displacement of the ball nut 33. An operating member (not shown), for example, is mounted at the tip end of the output shaft 34. The outer casing 36 is screwed into a housing 35 and fixed thereto.

Referring to FIG. 4–5, a small diameter portion 40 is formed at the base end portion of the ball screw shaft 32, the diameter of which is smaller than the outer diameter of a screw portion 45 of the ball screw shaft 32.

More particularly, FIG. 4 shows a compressive force receptive rotation member 42 and a tensile force receptive rotation member 43 with a thrust bearing 41 interposed therebetween. The compressive and tensile force receptive rotation members 42, 43 are loosely fitted around the small diameter portion 40. A shaft compressive step portion 44 is formed, perpendicularly to the longitudinal direction of the ball screw shaft 32, at the boundary between the small diameter portion 40 of the ball screw shaft 32 and the screw portion 45. The shaft compressive step portion 44 receives and blocks axial movement of the compressive force receptive rotation member 42, when a tensile force is applied to the ball screw shaft 32 in the direction of arrow E as shown in FIG. 1. A shaft tractive step portion 47, which faces the tensile force receptive rotation member 43, is fixed to the small diameter portion 40 by a setscrew 46.

The compressive force receptive rotation member 42 includes a cylindrical portion 48 which is covered with the thrust bearing 41 and a coil spring 50. The tensile force receptive rotation member 43 includes a cylindrical portion 49 for accommodating the shaft tractive step portion 47. The outer diameters of both cylindrical portions 48, 49 are the same.

A coil spring 50 is mounted on the outer periphery of the cylindrical portion 48, 49. The coil spring 50 is not fixed on the outer periphery of the cylindrical portion 48, 49, but loosely fitted therearound.

The coil spring 50, made of a wire having a square shaped cross section, is densely spiralled. An inner diameter of the coil spring 50, in its free length, is smaller than an outer diameter of the cylindrical portions 48 and 49. Accordingly, the coil spring 50, the inner diameter of which has been compulsorily expanded, is tightly fitted around the cylindrical portions 48 and 49.

A C-shaped snap ring 51 (hereinafter referred to as a "tensile force stopper") for engaging the compressive force receptive rotation member 42 is mounted on the interior surface of the outer casing 36. The small diameter portion 40 extends through an axial bore in a compressive force stopper 52 for blocking axial movement of the tensile force receptive rotation member 43, while the compressive force stopper 52 is mounted to the housing 35 by being screwed thereinto. The compressive force stopper 52 is screwed into the outer casing 36 by a tool (not shown) that cooperates with apertures 56 in the stopper.

A ball bearing 53, through which the small diameter portion 40 extends, is press fitted into the housing 35. A bevel gear 54 is press fitted into the ball bearing 53. The bevel gear 54 is engaged with a bevel gear 55 driven by the driving motor 31 as shown in FIG. 1. The bevel gear 54 includes a D-shaped shaft hole into which one end of the small diameter portion 40 having a flat providing a D-shaped cross section is inserted as shown in FIG. 4. Accordingly, the bevel gear 54, together with the small diameter portion 40, transmits a rotary driving force to the ball screw shaft 32, so that the output shaft 34 that connects with ball nut 33 slides in the axial direction.

The combined length of the compressive force receptive rotation member 42 and the tensile force receptive rotation member 43 is predetermined such that clearances can be made between the tensile force stopper 51 and the compressive force stopper 52 and between the shaft compressive step portion 44 and the shaft tractive step portion 47, respectively.

According to the above-mentioned prior apparatus, the small diameter portion 40 is formed at the base end portion of the ball screw shaft 32 in order to form the shaft compressive step portion 44. However, the diameter of the base end portion may be the same as that of the screw portion 45, wherein a snap ring may be mounted, or a collar may be formed, at the corresponding portion of the shaft compressive step portion 44 as a substitute for the shaft compressive step portion 44.

In operation, when force is applied to the output shaft 34 in the direction of arrow E as shown in FIG. 1, the force is exerted in the same direction on the ball screw 32 through the ball nut 33.

As shown in FIG. 4, the ball screw shaft 32 generates a rotary urging force in the direction of arrow F. When the: ball screw shaft 32 is pressed in the direction of arrow E, the shaft compressive step portion 44 presses the tensile force receptive rotation member 43, through the compressive force receptive rotation member 42 and the thrust bearing 41, against the compressive force stopper 52, thereby preventing the tensile force receptive rotation member 43 from rotating.

Further, the shaft compressive step portion 44 tends to rotate the compressive force receptive rotation member 42 in the direction of arrow P by the rotary urging force P. In this way, rotary force in the same direction as arrow F is exerted on the right end portion of the coil spring 50, as viewed in FIG. 4. However, because the left end portion of the coil spring 50 is mounted on the tensile force receptive rotation member 43, rotation of which is blocked, rotary force is exerted on the coil spring 50 in such a direction that the inner diameter thereof is reduced and makes the coil spring 50 tightened.

Because the coil spring 50 is not fixed on the compressive force receptive rotation member 42 and the tensile force receptive rotation member 43 but, instead, loosely fitted therearound, rotation of the compressive force receptive rotation member 42 is blocked by frictional force. Rotation of the compressive force receptive rotation member 42 is blocked by the frictional force or by slippage with respect to the coil spring 50.

This results in rotation of the ball screw shaft 32 being blocked, such that the ball screw shaft 32 is pressed against the compressive force receptive rotation member 42 through the shaft compressive step portion 44. Tightening of the coil spring 50 is released by rotating the ball screw shaft 32 of the driving motor 31 in the opposite direction of arrow F.

Next, operation of the prior apparatus in the event that tensile force in the direction of arrow G as shown FIGS. 1 and 5 is applied to the ball screw shaft 32 will be described.

When force is applied to the output shaft 34 in the direction of arrow G, the force is exerted in the same direction on the ball screw shaft 32 through the ball nut 33. As shown in FIG. 5, the ball screw shaft 32, integral with the shaft tractive step portion 47, moves in the same direction of arrow G, and the ball screw shaft 32 generates rotary urging force in the direction of arrow H.

As shown in FIG. 5, the shaft tractive step portion 47 presses the compressive force receptive rotation member 42, through the tensile force receptive rotation member 43 and the thrust bearing 41, against the tensile force stopper 51, thereby preventing the compressive force receptive rotation member 42 from rotating. The shaft tractive step portion 47, rotating in the direction of arrow H, tends to rotate the tensile force receptive rotation member 43 in the same direction of arrow H.

Exerted by the rotary force of the shaft tractive step portion 47, the tensile force receptive rotation member 43 tends to rotate the left end portion of the coil spring 50, as viewed in FIG. 3, in the direction of arrow H. However, the right end portion of the coil spring 50 as shown in FIG. 5, cannot rotate because of the compressive force receptive rotation member 42 which is pressed and rotation of which is blocked by the tensile force stopper 51. In this way, rotary force is exerted on the coil spring 50 in such a direction that the inner diameter thereof is reduced, thereby tightening the coil spring 50 about the compressive force receptive rotation member 42 and the tensile force receptive rotation member 43.

Because the coil spring 50 is not fixed on the compressive force receptive rotation member 42 and the tensile force receptive rotation member 43 but normally loosely fitted therearound, the rotation of the tensile force receptive rotation member 43 is blocked by frictional force. Rotation of the tensile force receptive rotation member 43 is blocked by frictional force or by slippage with respect to the coil spring 50. This results in the urging rotation of the ball screw shaft 32 being blocked. Tightening of the coil spring 50 is released by rotating the ball screw shaft 32 of the driving motor 31 in the opposite direction of arrow H.

In FIG. 1, the ball screw shaft 32 respectively moves in the direction of arrow E or G with respect to the housing 35 and the bevel gear 54 when compressive or tensile force is exerted, while the ball shaft 32 is allowed to move in a longitudinal direction thereof with respect to the bevel shaft 54 because they are interconnected by the D-shaped hole of the bevel gear 54 and the one end of the small diameter portion 40. Further, when the foregoing axial force is not exerted on the ball screw shaft 32, the compressive force receptive rotation member 42 is slightly in contact with the tensile force stopper 51 or is away therefrom, and the tensile force receptive rotation member 43 is slightly in contact with the shaft tractive step portion 47 and the compressive force stopper 52 or is away therefrom.

Because the driving motor 31 is composed of a gear motor having no brake, there is a possibility that the ball screw shaft 32 may rotate in the direction of arrow F or H when an axial force E or G is exerted thereon while power supply is off. However, the driving motor 31 cannot be made to rotate because rotation of the ball screw shaft 32 is blocked by the apparatus 60 for preventing urging rotation of the ball screw shaft.

In the above-mentioned related art, when an external force is repeatedly exerted on the output shaft 34 (as shown in FIG. 1) in the direction of arrow E as shown in FIG. 4, a pressure welding surface between the shaft compressive step potion 44 and the compressive force receptive rotation member 42 wears away. When the amount of wear increases, the ball screw shaft 32 moves an amount in the direction of arrow E corresponding to the amount of wear, the end of the shaft tractive step portion 47 is pressed against the compressive force stopper 52, thereby increasing friction resistance between them. Accordingly, when the ball screw shaft 32 is rotationally driven by the driving motor 31 (as shown in FIG. 1), it is difficult to start rotation of the ball screw shaft 32.

Further, when an external force is exerted on the output shaft 34 (as shown in FIG. 1) in the direction of arrow G, as shown in FIG. 5, the compressive force receptive rotation member 42 is pressed against the tensile force stopper 51, and the compressive force receptive rotation member 42 rotates slidingly against the tensile force stopper 51. Then, because tensile force stopper 51 is composed of the C-shaped snap ring, the diameter of the tensile force stopper 51 is reduced, thereby breaking the tensile force stopper 51 away from a concave-shaped ring recess in the outer casing in which the tensile force stopper 51 has been retained. Consequently, the related art has a problem that it causes a terrible dangerous condition because the output shaft 34 is made to extend outwardly in the direction of arrow G.

SUMMARY OF THE INVENTION

The present invention provides an apparatus for preventing urging rotation of a screw shaft of a linear working machine. A typical linear working machine includes a driving motor, a ball screw shaft made to rotate in a clockwise and counterclockwise direction by the driving motor, a ball nut reciprocating along the ball screw shaft, and an output shaft attached to the ball nut and linearly moving to-and-fro with respect to a housing of the linear working machine. The apparatus of the present invention is incorporated into the linear working machine in order to prevent urging rotation of the ball screw shaft.

The first preferred embodiment of the present invention for preventing urging rotation of the screw shaft of the linear working machine includes: a compressive force receptive rotation member loosely fitted around the base end portion of the ball screw shaft; a tensile force receptive rotation member loosely fitted around the base end portion of the ball screw shaft; a shaft compressive step portion formed at the base end portion of the ball screw shaft; a torque ring interposed between the compressive force receptive rotation member and the shaft compressive step portion for pressing against the compressive force receptive rotation member when compressive force is exerted on the ball screw shaft; a shaft tractive step portion, fixed on the base end portion of the ball screw shaft, for pressing against the tensile force receptive rotation member when tensile force is exerted on the ball screw shaft; a thrust bearing interposed between the compressive force receptive rotation member and the tensile force receptive rotation member; a compressive force stopper, mounted on the housing, for receiving the tensile force receptive rotation member pressed, through the compressive force receptive rotation member and the thrust bearing, by the shaft compressive step portion when compressive force is exerted on the ball screw shaft; a tensile force stopper, mounted on the housing, for receiving the compressive force receptive rotation member pressed, through the tensile force receptive rotation member and the thrust bearing, by the shaft tractive step portion when tensile force is exerted on the ball screw shaft; and a coil spring tightly mounted on the outer periphery of the compressive force receptive rotation member and the tensile force receptive rotation member, wherein when an external axial force, applied to the output shaft in an axial direction thereof, is exerted, through the ball nut, on the ball screw shaft so that a rotary force is generated in a clockwise or counterclockwise direction at the ball screw shaft, either of the compressive force receptive rotation member or the tensile force receptive rotation member rotates, thereby tightening the coil spring and blocking movement of the ball screw shaft.

A second preferred embodiment of the present invention for preventing urging rotation of the screw shaft of the linear working machine includes: a compressive force receptive rotation member loosely fitted around the base end portion of the ball screw shaft; a tensile force receptive rotation member loosely fitted around the base end portion of the ball screw shaft; a shaft compressive step portion, formed at the base end portion of the ball screw shaft, for pressing against the compressive force receptive rotation member when compressive force is exerted on the ball screw shaft; a shaft tractive step portion, fixed on the base end portion of the ball screw shaft, for pressing against the tensile force receptive rotation member when tensile force is exerted on the ball screw shaft; a thrust bearing interposed between the compressive force receptive rotation member and the tensile force receptive rotation member; a compressave force stopper, mounted on the housing, for receiving the tensile force receptive rotation member pressed, through the compressive force receptive rotation member and the thrust bearing, by the shaft compressive step portion when compressave force is exerted on the ball screw shaft; a tensile force stopper, mounted on the housing, for receiving the compressive farce receptive rotation member pressed, through the tensile force receptive rotation member and the thrust bearing, by the shaft tractive step portion when tensile force is exerted on the ball screw shaft; a collar interposed between the compressive force receptive rotation member and the tensile force stopper so that the compressive force receptive rotation member is not pressed against the tensile forte stopper, and a coil spring tightly mounted on the outer periphery of the compressive force receptive rotation member and the tensile force receptive rotation member, wherein when an external axial force, applied to the output shaft in an axial direction thereof, is exerted, through the ball Nut, on the ball screw shaft so that rotary force is generated in a clockwise or counterclockwise direction at the ball screw shaft, either of the compresssire force receptive rotation member or the tensile force receptive rotation member rotates, thereby tightening the coil spring and blocking movement of the ball screw shaft.

When an external axial force is applied to the output shaft in an axial direction and that force is transmitted through the ball nut to the ball screw shaft so that a rotary urging force is generated at the ball screw shaft in a clockwise or counterclockwise direction, either of the compressive force receptive rotation member or the tensile force receptive rotation member rotates, thereby tightening the coil spring and blocking movement of the ball screw shaft.

Then, the tightened coil spring blocks rotation of the compressive force receptive rotation member and the tensile force receptive rotation member by the frictional force developed between the spring and the compressive force receptive rotation member and the tensile force receptive rotation member.

Further, when a compressive force is repeatedly exerted on the output shaft in the direction of arrow E, wear is not generated on abutting surfaces between the compressive force receptive rotation member and the shaft compressive step portion because the torque ring is interposed between the compressive force receptive rotation member and the shaft compressive step portion. Accordingly, there is no possibility that the end of the shaft tractive step portion will come into contact with the compressive force stopper.

When a tensile force is repeatedly exerted on the output shaft in the direction of arrow G, a C-shaped snap ring acts as a tensile force stopper, is accompanied by the compressive force receptive rotation member, and does not move because the collar is interposed between the compressive force receptive rotation member and the tensile force stopper, Accordingly, since there is no possibility of reducing the diameter of the c-shaped snap ring, the C-shaped snap ring will not break away from the concave-shaped ring recess.

DETAILED DESCRIPTION OF THE PREFERRED EMBODIMENT

Figure 1:
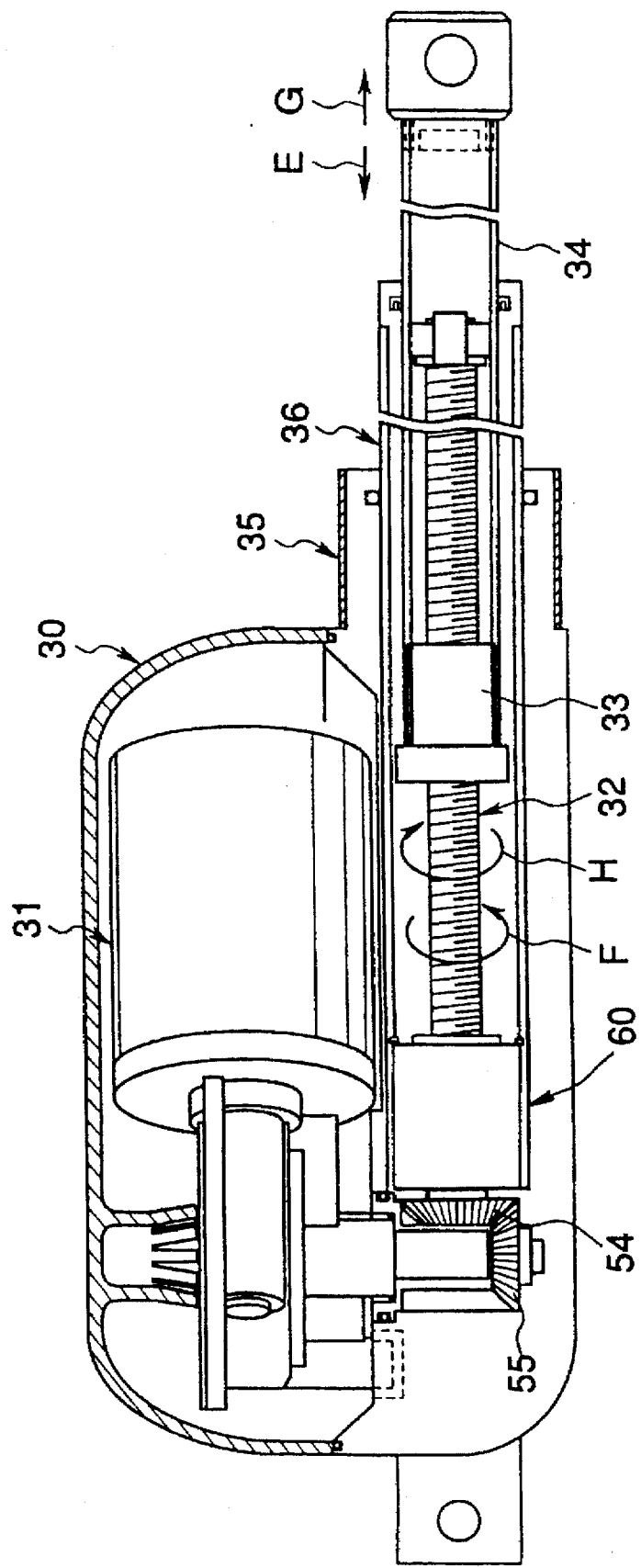
FIG. 1 is a front view of one embodiment of the linear working machine, showing a longitudinal section thereof with respect to a ball screw shaft, wherein the apparatus for preventing urging rotation of the ball screw shaft is installed therein.
Figure 2:
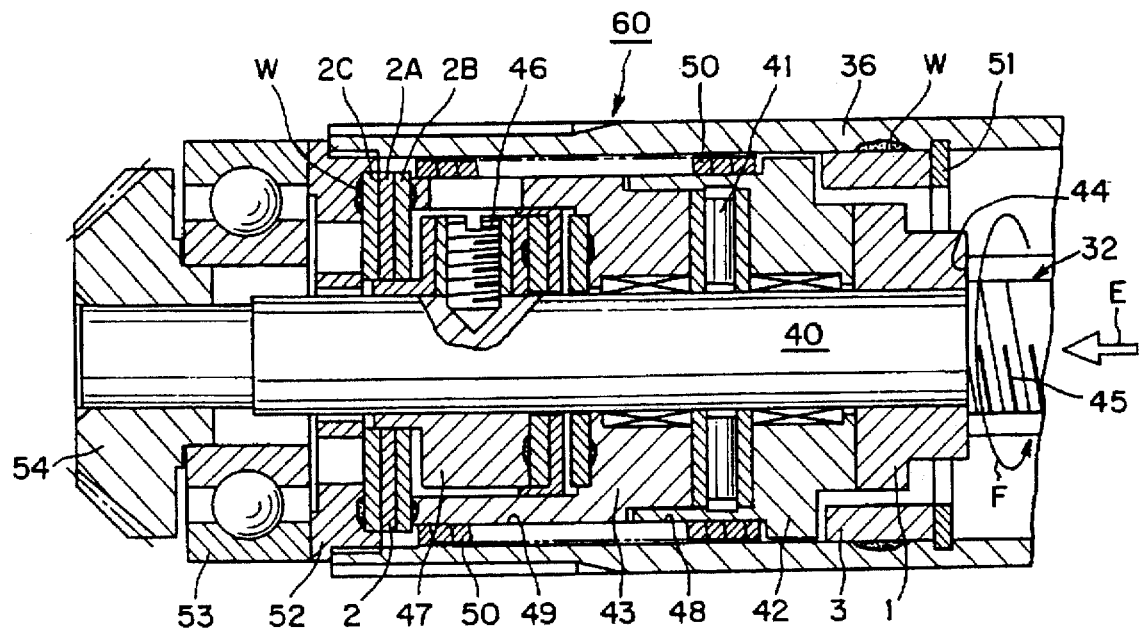
FIG. 2 is a front view of the apparatus for preventing urging rotation of the ball screw shaft, showing a longitudinal section thereof with respect to a ball screw shaft, in a condition in which a compressive force is applied to the ball screw.
Figure 3:
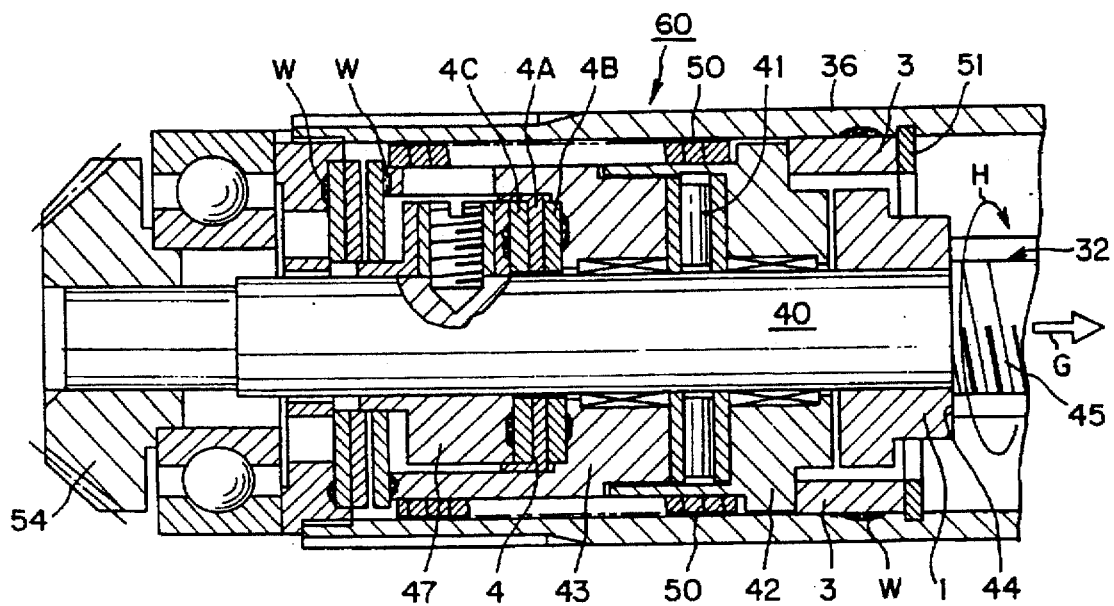
FIG. 3 is a front view of the apparatus for preventing urging rotation of the ball screw shaft, showing a longitudinal section thereof with respect to a ball screw shaft, in a condition in which a tensile force is applied to the ball screw.
Figure 4:
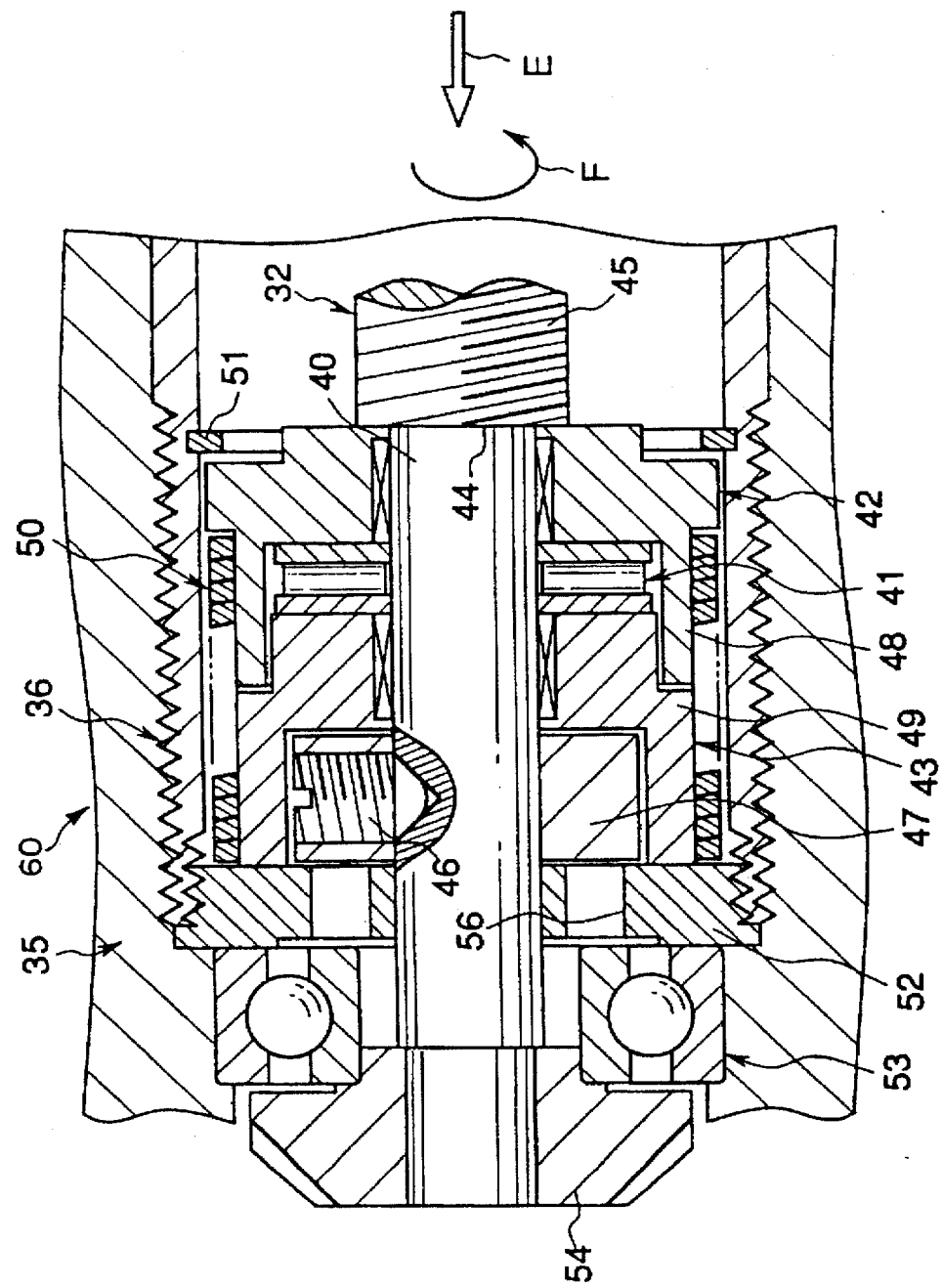
FIG. 4 is a front view which corresponds to FIG. 2 of a related prior art apparatus for preventing urging rotation of the ball screw shaft.
Figure 5:
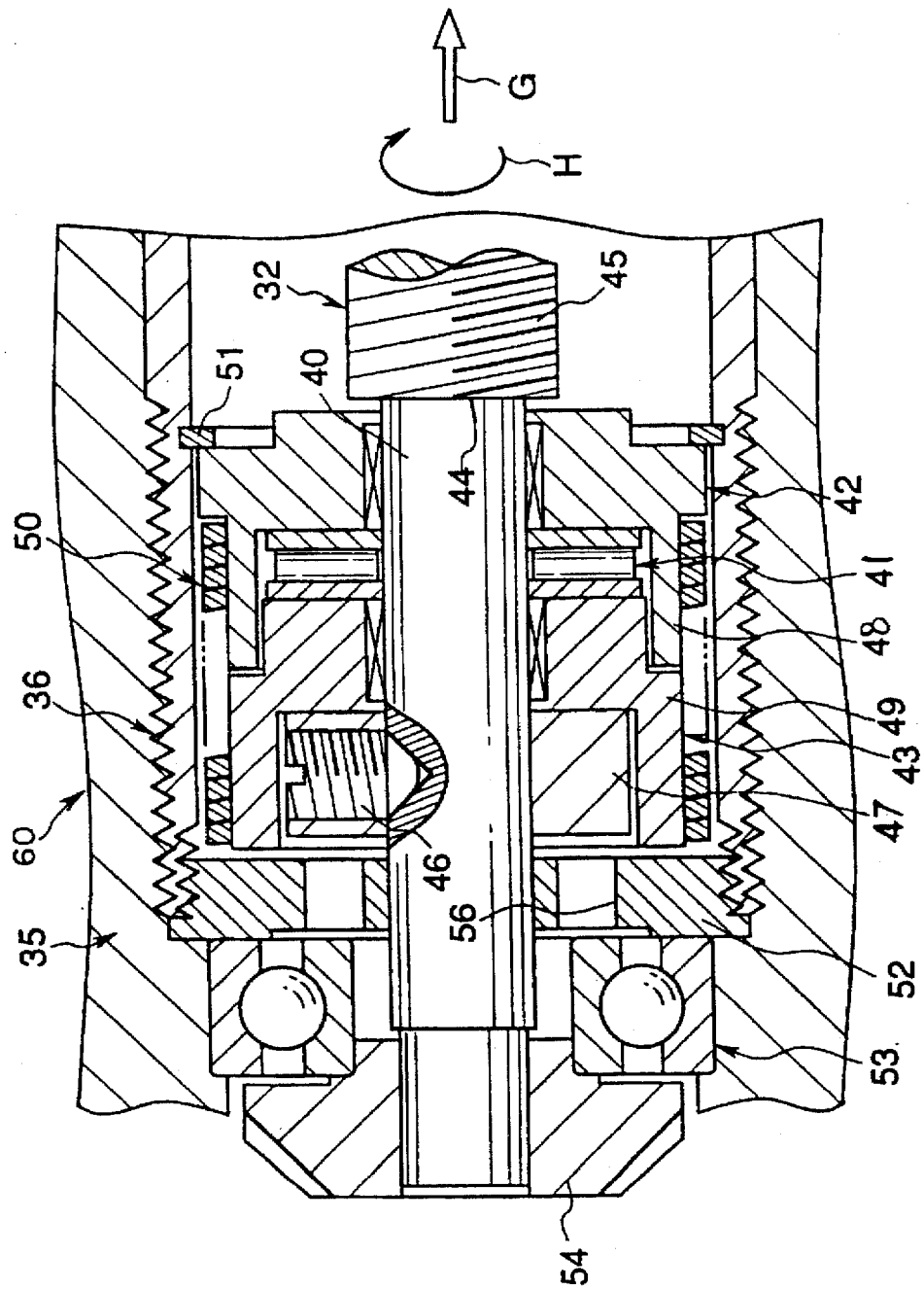
FIG. 5 is a front view which corresponds to FIG. 3 of the related prior art apparatus for preventing urging rotation of the ball screw shaft.

FIGS. 2 and 3 illustrate the preferred embodiment of apparatus for preventing urging rotation of a ball screw shaft of a linear working machine according to the present invention. In the following explanation of this embodiment, the same numerals and symbols are used for parts which are identical or similar with them of FIGS. 1, 4 and 5.

In FIG. 2, a torque ring 1 is interposed around the small diameter portion 40 between the compressive force receptive rotation member 42 and the shaft compressive step portion 44 of the ball screw shaft 32, and the torque ring 1 is in contact with and fixed to the shaft compressive step portion 44. When a compressive force is repeatedly exerted on the ball screw shaft 32 in the direction of arrow E, as shown in FIG. 2, wear is not generated on abutting surfaces between the shaft compressive step portion 44 and the torque ring 1 because there is no relative rotation between them. Accordingly, because the ball screw shaft 32 does not first move against the torque ring 1 in the direction of arrow E corresponding to the amount of wear, there is no possibility that the right end of the shaft tractive step portion 47 will be pushed against the compressive force stopper 52 through a thrust washer 2.

In addition, the thrust washer 2 includes a thrust receptive disk 2A made of resin, and flat washers 2B and 2C. The thrust receptive disk 2A is held between the flat washer 2B which is adhered to the end of the cylindrical portion 49 as by means of a bonding element W, as FIGS. 2 and 3, and the flat washer 2C which is adhered to the compressive force stopper 52 by a similar bonding element W.

FIG. 3 shows a tensile force being exerted on the ball screw shaft 32 in the direction of arrow G so that rotary urging power generated on the ball screw shaft 32 in the direction of arrow H. Then the shaft tractive step portion 47 is, through the right side surface of a thrust washer 4, pressed against the tensile force receptive rotation member 43 in the direction of arrow G. The thrust washer 4 includes a thrust receptive disk 4A made of resin, and flat washers 4B and 4C. The thrust receptive disk 4A is held between the flat washer 4B which is adhered by bonding material W to the tensile force receptive rotation member 43 and the flat washer 4C which is similarly adhered to the shaft tractive step portion 47. The tensile force receptive rotation member 43 pressed in the direction of arrow G is, through the thrust bearing 41, pressed against the compressive force receptive rotation member 42 in the direction of arrow G. However, because a collar 3 bondedly adhered to an interior surface of the outer casing 36 is interposed between the compressive force receptive rotation member 42 and the tensile force stopper 51, the compresive force receptive rotation member 42 is not directly pressed to the tensile force stopper 51. Further, the collar 3 is adhered to the interior surface of the outer casing 36. Accordingly, a rotary urging force on the compressive force receptive rotation member 42 in the direction of arrow H is not transmitted to the tensile force stopper 51.

According to the preferred embodiment of the present invention, the torque ring 1 is adhered to the shaft compressive step portion 44 of the ball screw shaft 32. Accordingly, when a compressive force is exerted in the direction of arrow E, the shaft compressive step portion 44 is pressed against the compressive force receptive rotation member 42 through the torque ring 1, so that the compressive force receptive rotation member 42 does not directly come into contact with the shaft compressive step portion 44. As a result, there is no possibility of wear on the compressive force receptive rotation member 42 by the shaft compressive step portion 44 and vice-versa.

Furthermore, the torque ring 1 is integrally adhered to the shaft compressive step portion 44. Accordingly, when a compressive force is repeatedly exerted in the direction of arrow E, the torque ring 1 does not wear do the shaft compressive step portion 44 and vice-versa. As a result, there is no possibility that the ball screw shaft 32 alone will be pressed and move in the direction of arrow E preceding movement of the compressive force receptive rotation member 42 and the tensile force receptive rotation member 43, so that there is no possibility that the shaft tractive step portion 44 will come into contact with the shaft tractive step portion 47 through the thrust washer 2, while the end of the cylindrical portion 49 of the tensile force receptive rotation member 43 is pressed against the compressive force stopper 52 through the thrust washer 2. As a result, urging rotation of the ball screw shaft 32 is prevented and further, the ball screw shaft 32 smoothly begins to rotate by action of the driving motor 31.

Furthermore, when tensile force is exerted on the ball screw shaft 32 in the direction of arrow G, the compressive force receptive rotation member 42 is pressed against the tensile force stopper 51 through the collar 3 fixed to the interior surface of the outer casing 36, so that the rotary urging force of the compressive force receptive rotation member 42 is not directly transmitted to the tensile force stopper 52. Accordingly, because there is no possibility that the tensile force stopper 52 can break away from the concave-shaped ring recess because of a reduction in the diameter of the tensile force stopper 52, the apparatus for preventing urging rotation of the ball screw shaft is surely stored retained and held in the housing 35.

The terms and expressions as used herein are terms of description and not of limitation. There is no intent, in the use of such terms and expressions, of excluding any of the equivalents of the features shown and described or portions thereof. It is recognized that various modifications are possible within the scope of the invention claimed.

What is claimed is:

1. An apparatus for preventing rotation of a ball screw shaft in a linear working machine including a driving motor, a ball screw shaft made to rotate in either a clockwise or counterclockwise direction by said driving motor, a ball nut reciprocating along said ball screw shaft, and an output shaft attached to said ball nut and linearly moving to-and-fro with respect to a housing of said linear working machine, wherein said apparatus for preventing rotation of a ball screw shaft comprises:

a compressive force receptive rotation member loosely fitted around a base end portion of said ball screw shaft;

a tensile force receptive rotation member loosely fitted around said base end portion of said ball screw shaft;

a shaft compressive step portion formed at said base end portion of said ball screw shaft;

a torque ring means mounted on said ball screw shaft and interposed between said compressive force receptive rotation member and said shaft compressive step portion, for pressing against said compressive force receptive rotation member when a compressive force is exerted on said ball screw shaft;

a shaft tractive step portion means, fixed on said base end portion of said ball screw shaft, for pressing against said tensile force receptive rotation member when a tensile force is exerted on said ball screw shaft;

a thrust bearing interposed between said compressive force receptive rotation member and said tensile force receptive rotation member;

a compressive force stopper means, mounted on said housing, and being operative for preventing axial movement of said tensile force receptive rotation member when pressed, through said compressive force receptive rotation member and said thrust bearing, by said shaft compressive step portion when said compressive force is exerted on said ball screw shaft;

a tensile force stopper means, mounted on said housing, for receiving said compressive force receptive rotation member and said thrust bearing, by said shaft tractive step portion when said tensile force is exerted on said ball screw shaft; and a coil spring tightly mounted on the outer periphery of said compressive force receptive rotation member and said tensile force receptive rotation member, wherein, when an external axial force, applied to said output shaft in an axial direction thereof, is exerted through said ball nut on said ball screw shaft so that rotary force is generated in the clockwise or counterclockwise direction at said ball screw shaft, either of said compressive force receptive rotation member or said tensile force receptive rotation member rotates, thereby tightening said coil spring and restraining said ball screw shaft against axial movement.

2. An apparatus for preventing rotation of a ball screw shaft in a linear working machine including a driving motor, a ball screw shaft made to rotate in either a clockwise or counterclockwise direction by said driving motor, a ball nut reciprocating along said ball screw shaft, and an output shaft attached to said ball nut and linearly moving to-and-fro with respect to a housing of said linear working machine, wherein said apparatus for preventing rotation of a ball screw shaft comprises:

a compressive force receptive rotation member loosely fitted around a base end portion of said ball screw shaft;

a tensile force receptive rotation member loosely fitted around said base end portion of said ball screw shaft;

a shaft compressive step portion, formed at said base end portion of said ball screw shaft, for pressing against said compressive force receptive rotation member when a compressive force is exerted on said ball screw shaft;

a shaft tractive step portion means, fixed on said base end portion of said ball screw shaft, for pressing against said tensile force receptive rotation member when a tensile force is exerted on said ball screw shaft;

a thrust bearing interposed between said compressive force receptive rotation member and said tensile force receptive rotation member;

a compressive force stopper means, mounted on said housing, for receiving said tensile force receptive rotation member pressed, through said compressive force receptive rotation member and said thrust bearing, by said shaft compressive step portion when said compressive force is exerted on said ball screw shaft;

a tensile force stopper means, mounted on said housing and being operative for preventing axial movement of said compressive force receptive rotation member when pressed, through said tensile force receptive rotation member and said thrust bearing, by said shaft tractive step portion when said tensile force is exerted on said ball screw shaft;

a collar fixed to said housing interposed between said compressive force receptive rotation member and said tensile force stopper so that said compressive force receptive rotation member is not pressed against said tensile force stopper means, and a coil spring tightly mounted on the outer periphery of said compressive force receptive rotation member and said tensile force receptive rotation member, wherein when an external axial force, applied to said output shaft in an axial direction thereof, is exerted, through said ball nut, on said ball screw shaft so that a rotary force is generated in the clockwise or counterclockwise direction at said ball screw shaft, either of said compressive force receptive rotation member or said tensile force receptive rotation member rotates, thereby tightening said coil spring and restraining said ball screw shaft against axial movement.

* * * * *